United States Patent
St. Laurent et al.

(10) Patent No.: US 9,760,329 B2
(45) Date of Patent: Sep. 12, 2017

(54) SYSTEM FOR INTERNET ENABLED PRINTING

(75) Inventors: Michael D. St. Laurent, Baden (CA); Dharmesh Krishnammagaru, Kitchener (CA); Craig A. Tomlin, Waterloo (CA); Michael Edward Kuindersma, Conestogo (CA); Jonathan Stairs, Kitchener (CA); Mark Onischke, Kitchener (CA); Conrad R. Clement, Kitchener (CA)

(73) Assignee: PRINTERON INC., Kitchener (CA)

(*) Notice: Subject to any disclaimer, the term of this patent is extended or adjusted under 35 U.S.C. 154(b) by 0 days.

(21) Appl. No.: 13/304,798

(22) Filed: Nov. 28, 2011

(65) Prior Publication Data

US 2012/0300251 A1    Nov. 29, 2012

Related U.S. Application Data

(60) Provisional application No. 61/418,143, filed on Nov. 30, 2010.

(51) Int. Cl.
*H04N 1/04* (2006.01)
*G06F 3/12* (2006.01)
(Continued)

(52) U.S. Cl.
CPC .......... *G06F 3/1289* (2013.01); *G06F 3/1206* (2013.01); *G06F 3/1245* (2013.01);
(Continued)

(58) Field of Classification Search
CPC . H04N 1/00244; G06F 3/1289; G06F 3/1206; G06F 3/1245; G06F 3/1292
(Continued)

(56) References Cited

U.S. PATENT DOCUMENTS 5,220,674 A    6/1993    Morgan et al.
5,580,177 A    12/1996    Gase et al.
(Continued)

FOREIGN PATENT DOCUMENTS

CA    2401738 A1    9/2001
EP    1170920    1/2002
(Continued)

OTHER PUBLICATIONS

Extended European Search Report dated Feb. 4, 2014 issued from the European Patent Office relating to European Patent Application No. 11824385.6.
(Continued)

*Primary Examiner* — Houshang Safaipour
(74) *Attorney, Agent, or Firm* — Grant Tisdall; Gowling WLG (Canada) LLP

(57) ABSTRACT

A system for internet enabled printing is disclosed. The system includes an internet print service that renders electronic documents from internet connected devices into an intermediate format for printing by an internet connected print client. The print client allows a printer connected to the print client to print electronic documents received from internet print service. A user registers with the internet print service to obtain an identifier for their printer that is accessible over the internet. The identifier can include an e-mail address so that electronic documents can be submitted to the registered printer via e-mail.

21 Claims, 4 Drawing Sheets

(51) Int. Cl.
  *H04N 1/00* (2006.01)
  *H04L 12/58* (2006.01)
(52) U.S. Cl.
  CPC .......... *G06F 3/1287* (2013.01); *G06F 3/1292* (2013.01); *H04N 1/00222* (2013.01); *H04N 1/00244* (2013.01); *H04L 51/08* (2013.01)
(58) Field of Classification Search
  USPC ........................................ 358/1.15, 1.14, 1.9
  See application file for complete search history.

(56) References Cited

U.S. PATENT DOCUMENTS

| | | | |
|---|---|---|---|
| 5,696,898 A | 12/1997 | Baker et al. | |
| 5,727,159 A | 3/1998 | Kikinis | |
| 5,764,235 A | 6/1998 | Hunt et al. | |
| 5,825,759 A | 10/1998 | Liu | |
| 5,826,062 A | 10/1998 | Fake et al. | |
| 5,872,926 A * | 2/1999 | Levac et al. | 709/206 |
| 5,903,723 A | 5/1999 | Beck et al. | |
| 5,958,006 A | 9/1999 | Eggleston et al. | |
| 5,987,611 A | 11/1999 | Freund | |
| 6,049,711 A | 4/2000 | Ben-Yehezkel et al. | |
| 6,064,656 A | 5/2000 | Angal et al. | |
| 6,085,227 A | 7/2000 | Edlund et al. | |
| 6,088,451 A | 7/2000 | He et al. | |
| 6,092,114 A | 7/2000 | Shaffer et al. | |
| 6,128,644 A | 10/2000 | Nozaki | |
| 6,138,162 A | 10/2000 | Pistriotto et al. | |
| 6,148,336 A | 11/2000 | Thomas et al. | |
| 6,151,624 A | 11/2000 | Teare et al. | |
| 6,161,139 A | 12/2000 | Win et al. | |
| 6,178,505 B1 | 1/2001 | Schneider et al. | |
| 6,182,142 B1 | 1/2001 | Win et al. | |
| 6,202,156 B1 | 3/2001 | Kalajan | |
| 6,212,565 B1 | 4/2001 | Gupta | |
| 6,219,786 B1 | 4/2001 | Cunningham et al. | |
| 6,226,752 B1 | 5/2001 | Gupta et al. | |
| 6,233,618 B1 | 5/2001 | Shannon | |
| 6,308,273 B1 | 10/2001 | Goertzel et al. | |
| 6,317,838 B1 | 11/2001 | Baize | |
| 6,324,648 B1 | 11/2001 | Grantges, Jr. | |
| 6,336,124 B1 | 1/2002 | Alam et al. | |
| 6,337,745 B1 * | 1/2002 | Aiello, Jr. | G06F 3/1204 358/1.1 |
| 6,345,288 B1 | 2/2002 | Reed et al. | |
| 6,345,300 B1 | 2/2002 | Bakshi et al. | |
| 6,349,336 B1 | 2/2002 | Sit et al. | |
| 6,360,252 B1 | 3/2002 | Rudy et al. | |
| 6,377,994 B1 | 4/2002 | Ault et al. | |
| 6,408,336 B1 | 6/2002 | Schneider et al. | |
| 6,438,585 B2 | 8/2002 | Mousseau et al. | |
| 6,438,586 B1 | 8/2002 | Mousseau et al. | |
| 6,442,541 B1 | 8/2002 | Clark et al. | |
| 6,445,824 B2 | 9/2002 | Hieda | |
| 6,453,353 B1 | 9/2002 | Win et al. | |
| 6,457,030 B1 | 9/2002 | Adams et al. | |
| 6,463,474 B1 | 10/2002 | Fuh et al. | |
| 6,490,624 B1 | 12/2002 | Sampson et al. | |
| 6,510,464 B1 | 1/2003 | Grantges et al. | |
| 6,513,061 B1 | 1/2003 | Ebata et al. | |
| 6,542,892 B1 | 4/2003 | Cantwell | |
| 6,549,949 B1 | 4/2003 | Bowman-Amuah | |
| 6,553,422 B1 | 4/2003 | Nelson | |
| 6,581,092 B1 | 6/2003 | Motoyama et al. | |
| 6,598,076 B1 | 7/2003 | Chang et al. | |
| 6,601,108 B1 | 7/2003 | Marmor | |
| 6,604,143 B1 | 8/2003 | Nagar et al. | |
| 6,606,660 B1 | 8/2003 | Bowman-Amuah | |
| 6,606,708 B1 | 8/2003 | Devine et al. | |
| 6,615,234 B1 * | 9/2003 | Adamske et al. | 709/203 |
| 6,662,228 B1 | 12/2003 | Limsico | |
| 6,681,392 B1 | 1/2004 | Henry et al. | |
| 6,687,732 B1 | 2/2004 | Bector et al. | |
| 6,690,481 B1 | 2/2004 | Yeung et al. | |
| 6,704,798 B1 | 3/2004 | Mogul | |
| 6,708,220 B1 | 3/2004 | Olin | |
| 6,718,328 B1 | 4/2004 | Norris | |
| 6,728,787 B1 | 4/2004 | Leigh | |
| 6,742,039 B1 | 5/2004 | Remer et al. | |
| 6,771,595 B1 | 8/2004 | Gilbert et al. | |
| 6,785,728 B1 | 8/2004 | Schneider et al. | |
| 6,829,646 B1 | 12/2004 | Philyaw et al. | |
| 6,885,860 B2 | 4/2005 | Bahl et al. | |
| 6,925,595 B1 | 8/2005 | Whitledge et al. | |
| 6,978,299 B1 | 12/2005 | Lodwick | |
| 6,981,045 B1 | 12/2005 | Brooks | |
| 7,037,198 B2 | 5/2006 | Hameen-Anttila | |
| 7,249,188 B2 | 7/2007 | Spicer et al. | |
| 7,328,245 B1 * | 2/2008 | Hull et al. | 709/206 |
| 7,904,594 B2 | 3/2011 | Spicer et al. | |
| 8,493,591 B2 * | 7/2013 | Kitagata | 358/1.15 |
| 2001/0044829 A1 | 11/2001 | Lundberg | |
| 2002/0013869 A1 * | 1/2002 | Taniguchi et al. | 710/33 |
| 2002/0016818 A1 | 2/2002 | Kirani et al. | |
| 2002/0066026 A1 | 5/2002 | Yau et al. | |
| 2002/0122201 A1 | 9/2002 | Haraguchi | |
| 2002/0143773 A1 | 10/2002 | Spicer et al. | |
| 2002/0155843 A1 | 10/2002 | Bahl et al. | |
| 2003/0037126 A1 | 2/2003 | Spicer et al. | |
| 2003/0051038 A1 | 3/2003 | Spicer et al. | |
| 2003/0078965 A1 | 4/2003 | Cocotis et al. | |
| 2003/0079030 A1 | 4/2003 | Cocotis et al. | |
| 2003/0090694 A1 | 5/2003 | Kennedy et al. | |
| 2003/0103226 A1 * | 6/2003 | Nishio | 358/1.13 |
| 2003/0191676 A1 | 10/2003 | Templeton | |
| 2003/0197887 A1 | 10/2003 | Shenoy et al. | |
| 2004/0125401 A1 | 7/2004 | Earl et al. | |
| 2004/0190049 A1 * | 9/2004 | Itoh | 358/1.15 |
| 2004/0252337 A1 | 12/2004 | Takabayashi et al. | |
| 2005/0085241 A1 | 4/2005 | Bahl et al. | |
| 2005/0094191 A1 * | 5/2005 | Vondran, Jr. | G06F 3/1212 358/1.15 |
| 2005/0255861 A1 | 11/2005 | Wilson et al. | |
| 2006/0168258 A1 | 7/2006 | Spicer et al. | |
| 2006/0238797 A1 * | 10/2006 | Berglin | 358/1.15 |
| 2006/0274357 A1 * | 12/2006 | Shen | 358/1.15 |
| 2007/0234354 A1 | 10/2007 | Hattori | |
| 2008/0184162 A1 | 7/2008 | Lindsey et al. | |
| 2008/0193182 A1 | 8/2008 | Sasama | |
| 2008/0201236 A1 * | 8/2008 | Field | G06Q 10/087 705/26.5 |
| 2008/0246988 A1 | 10/2008 | Ashton | |
| 2009/0225338 A1 * | 9/2009 | Kitahara | 358/1.9 |
| 2010/0094979 A1 | 4/2010 | Azami | |
| 2010/0095367 A1 | 4/2010 | Narayanaswamy | |
| 2010/0103453 A1 * | 4/2010 | Tsutsumi | 358/1.15 |
| 2011/0235085 A1 * | 9/2011 | Jazayeri | G06F 3/1204 358/1.14 |
| 2011/0299110 A1 * | 12/2011 | Jazayeri | G06F 3/1204 358/1.15 |

FOREIGN PATENT DOCUMENTS

| | | |
|---|---|---|
| EP | 1271302 A2 | 1/2003 |
| EP | 1435565 | 7/2004 |
| EP | 1460529 | 9/2004 |
| WO | 9836344 | 8/1998 |
| WO | 9840992 | 9/1998 |
| WO | 9922294 | 5/1999 |
| WO | 9965256 | 12/1999 |
| WO | 0011850 | 3/2000 |
| WO | 0122259 | 3/2001 |
| WO | 03019403 A2 | 3/2003 |

OTHER PUBLICATIONS

Extended European Search Report dated Feb. 5, 2014 issued from the European Patent Office relating to European Patent Application No. 11824383.1.

Liljeberg M. et al., "Enhanced Services for World-Wide Web in Mobile WAN Environment", Apr. 1, 1996, University of Helsinki,

(56) References Cited

OTHER PUBLICATIONS

Department of Computer Science, Publication No. C-1996-28, Helsinki, Finland, XP002162553.
Zenel B. et al., "Intelligent Communication Filtering for Limited Bandwidth Environments", Workshop on Hot Topics in Operating Systems, May 4, 1995, pp. 28-34, XP002094011, p. 28, line 12-p. 34, line 11.
Australian Examination Report dated May 25, 2005 issued from the Australian Patent Office relating to Australian Patent Application No. 2001243980.
Canadian Office Action dated Aug. 7, 2012 issued from the Canadian Intellectual Property Office relating to Canadian Patent Application No. 2,301,996.
Canadian Office Action dated Jan. 5, 2011 issued from the Canadian Intellectual Property Office relating to Canadian Patent Application No. 2,301,996.
Canadian Office Action dated Jul. 16, 2008 issued from the Canadian Intellectual Property Office relating to Canadian Patent Application No. 2,301,996.
Sitao W. et al.: "Using Device Driver Software in Scada Systems" 2000 IEEE Power Engineering Society. Winter Meeting Conference Proceedings. Singapore, Ja 23-27, 2000, IEEE Power Engineering Society Winder Meeting, New York, NY: right-hand column, paragraph 3, p. 2047, right-hand column, paragraph 1.
Qi Lu et al., "Efficient large-scale access control for Internet/intranet information systems", System Sciences, Proceedings of the 32nd Annual Hawaii International Conference on Volume, Jan. 5-8, 1999, pp. 9pp.
Hiltunen et al., "Access control in wide-area networks", Distributed Computing Systems, Proceedings of the 17th International Conference, May 27-30, 1997 pp. 330-337.
Johnston et al., "Authorization and attribute certificates for widely distributed access control", Enabling Technologies: Infrastructure for Collaborative Enterprises, Proceedings, Seventh IEEE International Workshops, Jun. 17-19, 1998, pp. 340-345.
Kumar et al., "Security management architecture for access control to network resources", Computers and Digital Techniques, IEE Proceedings—vol. 144, Issue 6, Nov. 1997, pp. 362-370.
International Search Report, PCT Application No. PCT/CA2011/000991 dated Dec. 19, 2011.
International Search Report, PCT Application No. PCT/CA2011/000994 dated Dec. 1, 2011.
Extended European Search Report dated Jan. 23, 2014 relating to European Patent Application No. 11824384.9.
Canadian Office Action dated Jul. 30, 2009 issued from the Canadian Intellectual Property Office relating to Canadian Patent Application No. 2,401,738.
Canadian Office Action dated Nov. 27, 2007 issued from the Canadian Intellectual Property Office relating to Canadian Patent Application No. 2,401,738.
Canadian Office Action dated Apr. 28, 2009 issued from the Canadian Intellectual Property Office relating to Canadian Patent Application No. 2,401,717.
Canadian Office Action dated Sep. 21, 2007 issued from the Canadian Intellectual Property Office relating to Canadian Patent Application No. 2,401,717.
Canadian Office Action dated Apr. 24, 2007 issued from the Canadian Intellectual Property Office relating to Canadian Patent Application No. 2,401,729.
Canadian Office Action dated Aug. 13, 2009 issued from the Canadian Intellectual Property Office relating to Canadian Patent Application No. 2,401,721.
Canadian Office Action dated Nov. 21, 2007 issued from the Canadian Intellectual Property Office relating to Canadian Patent Application No. 2,401,721.
Extended European Search Report dated May 13, 2011 relating to European Patent Application No. 10011973.4.
European Examination Report dated Feb. 26, 2013 relating to European Patent Application No. 10011973.4.
International Search Report, PCT Application No. PCT/CA2011/000992.
International Search Report, PCT Application No. PCT/CA2011/000993.
International Search Report, PCT Application No. PCT/CA2011/000995.
International Search Report, PCT Application No. PCT/CA2011/001295.

\* cited by examiner

SYSTEM FOR INTERNET ENABLED PRINTING

CROSS-REFERENCE TO RELATED APPLICATIONS

This application claims the benefit of U.S. Provisional Application No. 61/418,143, filed Nov. 30, 2010, all of which is incorporated by reference herein.

FIELD

The present disclosure relates generally to a system for internet enabled printing, and more particularly for distributing print data in an internet enabled printing system.

BACKGROUND

With the proliferation of mobile computing, users are often not directly connected to a printer but need hard copies of electronic documents. Since the devices are mobile, the users can be located anywhere, and are not necessarily connected to the same network as their printer. Printing an electronic document located on a mobile device is typically a disconnected two step process. The mobile device user will first transmit the document to a system connected to a printer using the mobile device, and then initiate printing the document from the printer-connected system. This requires that the user be located at the printer connected system to complete the process.

Electronic documents can also be in any number of formats that may not be supported for viewing on the mobile device or printing on the printer-connected system. These incompatibilities can be the result of different applications or operating systems using different document formats. Electronic document incompatibilities can add an additional step for printing an electronic document located on a mobile device.

SUMMARY

According to a first aspect, a system is provided for printing electronic documents over the internet that comprises an internet print service for receiving a first electronic document over the internet, and a print client connected to a printer for receiving a second electronic document from the internet print service, the second document based on the first electronic document received by the internet print service, and initiating the printer to print the second electronic document. In some aspects, the internet print service converts the first electronic document into an intermediate format supported by the print client. The conversion can be based on printing options that are provided with the first electronic document. The intermediate format can be JPEG, TIFF or PDF, and may be supported natively by the printer. In another aspect, the print client renders the second electronic document for printing with the printer. The internet print service can receive the first electronic document by e-mail or through a web interface.

In another aspect, the internet print service has a registry database that associates the printer with an identifier that is received with the first electronic document. The identifier can include an e-mail address at the internet domain of the internet print service. In some aspects, the registry database stores printing options used to provide printing options used to the convert the first electronic document into the second electronic document. In other aspects, the registry database stores authorization information associated with the printer that is used to authorize the first electronic document for printing on the printer. In some aspects, the authorization information can include an access control list that contains whitelisted e-mail addresses. In another aspect, the internet print service has a web portal that provides an interface for account creation and management that stores account information in the registry database.

In yet another aspect, the system further comprises a messaging module that is coupled to the internet print service for receiving presence information through a messaging protocol from the print client to notify the internet print service that the print client is available to receive the second electronic document. The messaging module can be configured to send a message to the print client to notify the print client that the second electronic document is available. In a related aspect, the system further comprises a number of document distributors that have storage for a number of second electronic documents, the document distributors provide load distribution between themselves to efficiently deliver the second electronic documents to print clients by the internet print service. The internet print service can distribute a second electronic document to one of the document distributors through the messaging module sending a message to the print client indicating that the second electronic document is available at the selected document distributor. Presence information received by the messaging module can be used to determine whether the send the message to the print client or store the message.

DRAWINGS

For a better understanding of the various embodiments described herein and to show more clearly how they may be carried into effect, reference will now be made, by way of example only, to the accompanying drawings which show at least one exemplary embodiment, and in which:

FIG. 1 a block diagram of a system for providing print services over the internet;

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computers may be a server class computer having multiple processors and at least one network interface card. Program code may operate on input data to perform the functions described herein and generate output data.

Figure 1:
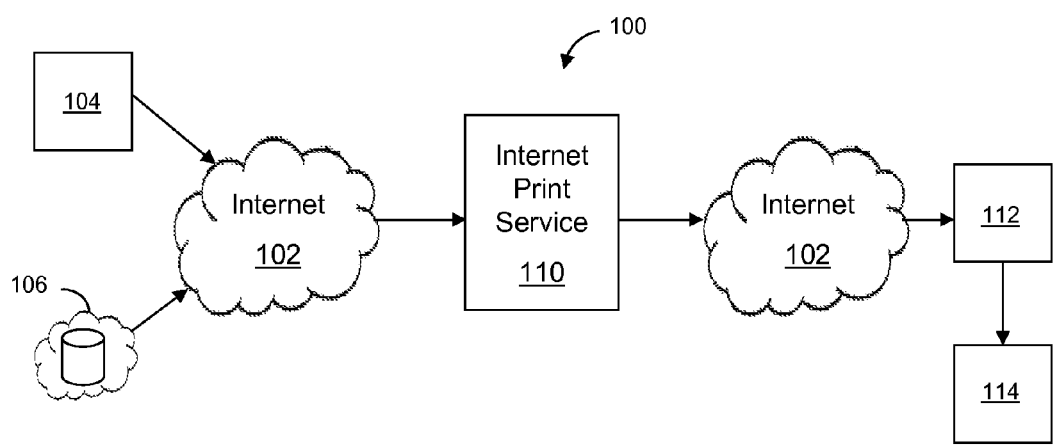

Reference is first made to FIG. 1, shown is a block diagram of a system 100 for providing print services over internet 102. A document is submitted over internet 102 by either an internet connected device 104 or a cloud document storage service 106 to an internet print service 110. Internet print service 110 then renders the document into a format that is compatible with print client 112. The rendered document is then provided to print client 112 over internet 102. Print client 112 then renders the document in a format supported by printer 114 for printing the document. Although internet 102 is shown, other embodiments can include other public or private wide area networks in the place of, or in combination with, the public internet.

Internet connected device 104 can send documents through e-mail or through web protocols, such as HTTP and HTTPS, to internet print service 110. Internet connected device 104 can be any device capable of sending an e-mail and can include mobile e-mail devices, such as cell phones, smart phones, personal digital assistants, or tablet computers, and can also include internet-connected personal computers. Internet connected device 104 could also include a server that forwards messages to an e-mail address. The forwarded messages could include e-mail messages, instant messaging platform messages, or SMS or MMS cell phone messages.

A document stored on internet connected device 104 can be printed on printer 114 by sending the document as an attachment to an e-mail message that is destined for internet print service 110. Each printer managed by internet print service 110 will have its own unique e-mail address at the domain of internet print service 110 that can be assigned when a printer registers with the service. For example, printer 114 may have an e-mail address: printer114@internetprintservice110.com.

Documents can also be submitted by internet connected device 104 through a web portal hosted by internet print service 110 that allows internet connected device 104 to submit a document over the portal. The web portal can also provide a web services interface that can be used by applications executing on internet connected device 104 to submit documents to internet print service 110. The web services interface can also be utilized by servers that implement cloud document storage service 106 to allow documents stored on the service to be submitted to internet print service 110. Internet connected device 104 can also manage access to printer 114 and other account details through an interface provided by internet print service 110.

Internet print service 110 is comprised of one or more servers that are interconnected and have access to internet 102. The servers include one or more processors that execute program code from memory in order to configure the processor(s) to provide the functionality of internet print service 110. The servers typically include a network interface for intercommunication between servers and internet 102. The servers can also include storage for various databases relating to printers, users, and documents processed by internet print service 110.

Internet print service 110 provides an interface for receiving electronic documents from internet connected device 104 and provides an interface to allow users of internet print service 110 to manage their account. User account information, including information about the user and their printer 114 are stored in a database at internet print service 110. Internet print service 110 will consult the database to authorize users and determine the options to use to render documents for compatibility with print client 112 and printer 114. Internet print service 110 provides the rendered document to print client 112 for printing on printer 114.

Print client 112 can be any internet-connected device that connects to printer 114 to provide access to internet print service 110. Print client 112 can include a personal computer that is running software to configure the personal computer to communicate with internet print service 110 to provide documents to printer 114. Print client 112 can also operate on other hardware that acts as a print server for a connected printer 114. For example, consumer and small business networking hardware, such as routers or network attached storage devices, include a print server feature and have a processor and memory that could be configured to run software to implement print client 112. A set-top box connected to a television or software executing on a television could also serve as a print client 112, examples include, but are not limited to, cable boxes, IPTV receivers, DVD/Blu-Ray players, or application suites available on televisions. Print client 112 can also be integrated into printer 114 in the form of software executing on a processor of printer 114. Software can include firmware stored in non-volatile memory of printer 114.

Printer 114 produces text and graphics of electronic documents on physical print media (e.g. paper or transparencies). Printer 114 can be connected to print client 112 as a local peripheral that is attached by a printer cable or USB cable. Printer 114 can also be a network printer that includes a built-in network interface, typically wireless and/or Ethernet based. A network printer can include print client 112 or print client 112 can be located on an external device connected to the same network as the network printer.

Printer 114 can have a number of different capabilities and options including, among others, supported paper formats, color printing, duplex printing, collating, scaling to fit paper, multi-page printing, orientation (e.g. landscape or portrait), print quality, and watermarks. A record of capabilities and options of printer 114 can be stored by internet print service 110 and configured by a user, either globally, per job, or per user.

Figure 2:
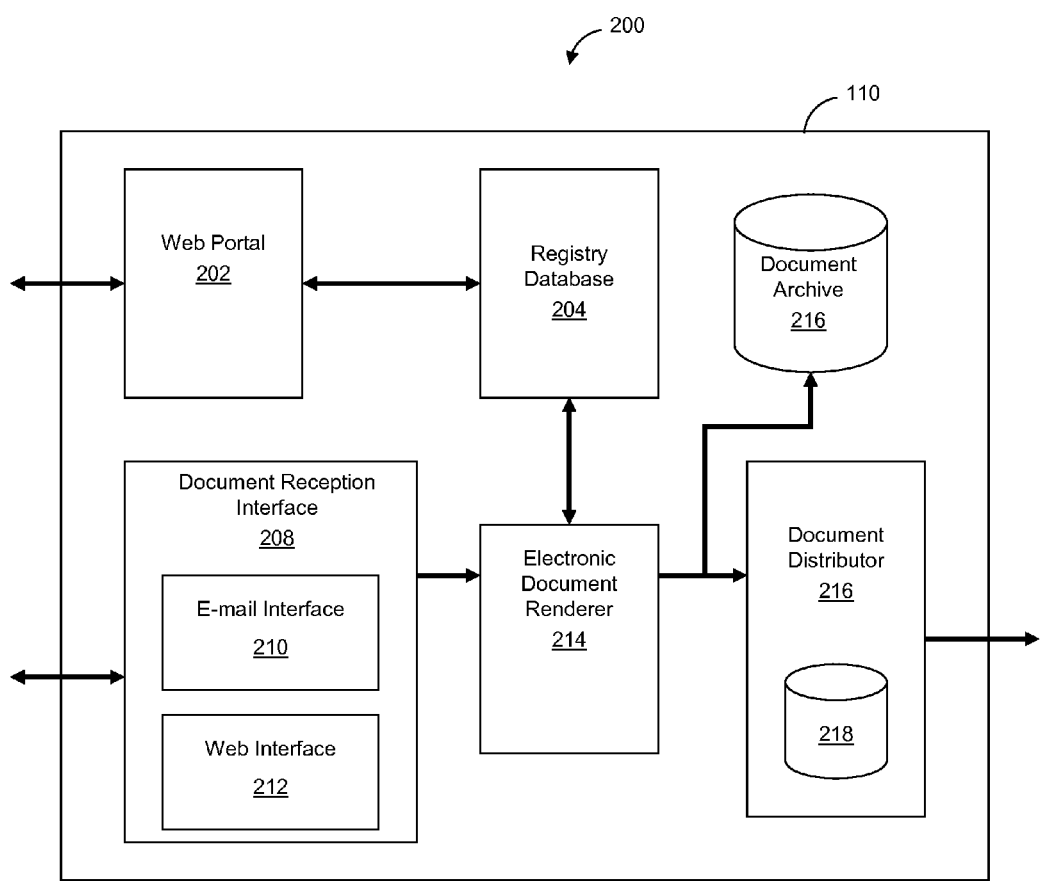
FIG. 2 is a block diagram illustrating the components of internet print service shown in FIG. 1.

Now referring to FIG. 2, shown is a block diagram 200 illustrating the components of internet print service 110 shown in FIG. 1. The blocks in diagram 200 can represent a logical or functional separation of the elements of internet print service 110. The blocks in diagram 200 can also represent hardware, such as a specifically tasked server or cluster of servers, or a software module executing on a server (or multiple servers) to perform a specific task. Each block does not necessarily have to be co-located with other blocks shown in diagram 200. For example, internet print service 110 could have multiple print delivery servers located around the world that are separately located from other elements shown in block diagram 200. Internet print service 110 may also include multiple servers for purposes of load balancing, redundancy, disaster recovery or back-up purposes that are not shown in FIG. 2. Internet print service 110 includes a web portal 202 that can provide a user interface or application interface for interacting with internet print service 110. Web portal 202 can be a web page that is hosted by internet print service 110 that allows a user to create and manage their account with the service. In addition, web portal 202 can provide a web services application interface that allows an application running on a device external to access internet print service 110 to create and manage a user account. For example, print client 112 or internet connected device 104 could include an interface to web portal 202 that allows a user to create and manage their account from print client 114.

Web portal 202 can allow a user to create an account and associate the account with a printer client 112 or printer 114. A user creates an account by providing their name, e-mail address, and other identifying information to internet print service 110 through web portal 202. The other identifying information can include a street address, location information, such as geographical coordinates from a GPS or Wi-Fi-based location service, and details about printer 114 including, but not limited to, the printer manufacturer and model identification. Creating an account typically includes setting up account credentials, such as a unique user name and a password for the user. Once the account is created a confirmation e-mail can be sent to the user that contains a link that a user clicks to activate the account. Account creation may also involve a billing process that allows a user to pay for the service and any additional features of the service, such as having multiple printers or additional storage of electronic documents. Information associated with the user's account, including the user name and password can be stored in registry database 204.

During or after the account creation process, printer 114 can be registered with the user's account. Registration involves associating a unique identifier between a user account and an instance of print client 112. The unique identifier can include a serial number or e-mail address that identifies print client 112 to internet print service 110. The user can be provided the unique identifier as part of the account creation process that the user then provides to print client 112. Registration can also be performed by print client 112 requesting a unique identifier as part of the setup or installation process of print client 112. For example, if a user downloads and installs print client 112 on their personal computer, the user can provide their account credentials to configure print client 112 that then uses the credentials to obtain a unique identifier from web portal 202. The association between the unique identifier and the user account is then stored in the registry database 204.

If internet print service 110 is configured for only a single printer 114 to be managed by print client 112, then the unique identifier may be used to send electronic documents to printer 114. For example, internet print service 110 could associate an e-mail address in the form of unique_identifier@internetprintservice110.com for printer 114. Alternatively, internet print service 110 could be configured to include an additional layer of abstraction by also having a unique identifier for each printer 114. This can allow print client 112 to manage multiple printers 114. Registry database 204 can store the printer identifiers and associate them with either a user account directly or indirectly through a print client 112 associated with a user account.

Web portal 202 can also provide an interface to allow user to manage printers associated with their account. Users can enable and disable internet print service 110 for a printer 114 associated with their user account via web portal 202. Available printing options and default printing options can be specified for an associated printer. Printing options can include paper size and print quality, among others. Changes made to printing options are then stored in registry database 204.

An access control list can also be specified through web portal 202 that allows a user to specify permissions to use printer 114. The access control list can be a whitelist of e-mail addresses that the user has approved to send electronic documents to printer 114. The whitelist can incorporate wildcards to allow all users from a certain domain or with a certain e-mail address format to be specified. For example, a whitelist entry can include "*@myworkplace.com" in order to accept documents from any e-mail address from the myworkplace.com domain.

Web portal 202 can also allow a user to provide release settings that are used to determine how to release a print job to a printer. An automatic release setting can be specified to release all print jobs submitted to a printer through internet print service. The automatic release can be limited to only users specified on the whitelist. The user can also specify a manual release method that requires approval to release all print jobs. A user can also request to receive notification when a print job is submitted to a printer associated with their account. The notification can include an e-mail to the address associated with the account that includes an HTTP link that when clicked releases the print job. Releasing print jobs can be managed by internet print service 110 or print client 112. If print client 112 manages releasing jobs then the release settings can be propagated to the print client 112 from internet print service 110.

Web portal 202 can also provide reports of printing activity that a user can access to review print jobs that have been submitted to a printer associated to their account. Reports can include the file name of the electronic document, the document type (e.g. a word processor document, spreadsheet, PDF file, etc.), number of pages printed, printing options used, information identifying who submitted the electronic document, such as an e-mail address, and the result of print job (e.g. successful, pending, error, not in whitelist, etc.). Internet print service 110 can obtain report information from document archive 206. The reporting feature can also allow the user to preview or download the electronic documents from document archive 206 that were submitted to printer 114. Document archive 206 can be provided as an optional feature to allow users to store all printed documents on internet print service 110 for later re-printing or reference. An option to resubmit a document to the printer may also be provided in reporting information.

Registry database 204 stores data associated with user accounts and printers registered with internet print service 110. Records in registry database 204 for users can include user name and password; e-mail address of user; access control lists; identification of registered printers associated with the user account; and other data related to the user's account. A user could also be identified or authenticated by a hardware identifier stored in registry database 204. The hardware identifier could include a MAC address for a network interface card or an International Mobile Equipment Identifier (IMEI).

Records in registry database 204 for printers and print clients can include identification information of printers, including name, network address, and printer capabilities and options. A printer may be identified by a globally unique identifier that is used by internet print service 110. Registry database 204 can also contain a mapping from a printer identifier, such as an e-mail address, to the globally unique identifier. Print history records can also be stored in registry database 204 that provide a printing history for each printer and the status of each print job.

Document reception interface 208 receives electronic documents from internet connected device 104 or cloud document storage service 106. Document reception interface 208 can include e-mail interface 210 for receiving electronic documents as attachments to e-mail messages received by internet print service 110. Document reception interface 208 can also include web interface 212 for receiving electronic documents over an HTTP or HTTPS connection. Web interface 212 can work in conjunction with web portal 202 to provide a web page that allows a user upload an electronic document through the web page. Web interface 212 can also provide an application interface to allow applications to upload electronic documents to internet print service 110 over the web interface, such as from an application running on internet connected device 104 or cloud document storage service 106.

Document reception interface 208 can communicate with registry database 204 to determine whether a request to print an electronic document is authorized. This can include validating account credentials provided to web interface 212 or verifying if an e-mail sender is on the whitelist for a requested printer 114. Authorized print requests can then be forwarded to electronic document renderer 214 along with accompanying print request options (e.g. page ranges, paper size, print quality, etc.).

E-mail interface 210 can be implemented by an e-mail server that can further include an e-mail spam filter device. E-mail spam can be filtered based on whitelist e-mail addresses provided by users. E-mail spam can also be filtered by a third party service external to internet print service 110 to offload e-mail spam processing from internet print service 110.

When an e-mail is received, e-mail interface 210 must determine which attachments should be printed. Attachments can be evaluated based on a number of factors, such as, for example, the file type and the physical size of the document. For example, in an e-mail with multiple attachments, e-mail interface 210 could determine not to print JPEG image attachments below a certain size since these may be signature images rather than pertinent electronic documents. The physical dimensions of an attachment can also be used to determine whether to print an attachment. E-mail attachments can also include transport or presentation information that may be used in determining whether an attachment should be printed. In some e-mails, included attachments are intended to provide assistance displaying the associated attachments and not intended to be printed itself.

E-mail interface 210 can also parse print options that are provided in the e-mail message. If a user does not wish to use their default print options provided through web portal 202, they can provide print options in the subject line or message body of the e-mail. For example, "PQUAL: DRAFT" in the subject line of the message could specify that the attached documents are to be printed as draft quality by printer 114.

E-mail interface 210 can also send e-mail notifications to users of internet print service 110. E-mail notifications can include simple updates when a print job is completed, reporting account activity or reporting error conditions, such as when an electronic document is not able to be printed. Interactive e-mail notifications can also be sent to users of internet print service 210 by including a link to web portal 202. The link can be used to seek authorization to release a print job to printer 114, request payment or billing information, or to present the user submitting an electronic document or creating an account with a challenge-response test to verify that the user is a human.

Electronic documents received by document reception interface 208 are provided to electronic document renderer 214 that renders the electronic document in a format that is supported by print client 112 and printer 114. Electronic document renderer 214 can be implemented by one or more servers to provide enough processing power to render all electronic documents submitted through document reception interface 208 in a timely manner. Document reception interface 208 also provides the printing options to electronic document renderer 214. Electronic document renderer 214 can retrieve default printing options and printer capabilities of the destination print client 112 and printer 114 from registry database 204. Electronic document renderer 214 can also determine whether the print request is authorized according to the access control list stored in registry database for printer 114.

Once electronic document renderer 214 has determined the appropriate printing options, the electronic document can be rendered into an intermediate document format that is supported by print client 112. Typically, the intermediate document format is supported natively by the operating system of print client 112 or is a commonly available document format. Examples of intermediate document formats can include the portable document format (PDF), Tagged Image File Format (TIFF), and JPEG file formats. If an electronic document is already in one of the acceptable formats, electronic document renderer 214 may still process the electronic document to conform to the options supported by printer 114 and print client 114, such as paper size, for example. Electronic document renderer 214 can use a single intermediate document format or, if multiple formats are supported by internet print service 110, electronic document renderer can obtain the intermediate document format supported by print client 112 from registry database 204. Print client 112 can provide its supported intermediate document types to registry database 204 upon installation of the software or upon registering printer 114.

Rendering electronic documents into an intermediate document format at internet print service 110 allows print client 112 to have a smaller subset of print rendering routines to handle the intermediate document format rather than all possible electronic document formats. This allows print client 112 to be deployed as a software application that does not require a large amount of storage memory. Print client 112 also does not require a large amount of processing power since the electronic document is rendered by internet print service 110 into an intermediate document format that is more efficient for print client 112 to process for printer 114.

After the intermediate document is generated by electronic document renderer 214, the intermediate document format is provided to document distributor 216 for delivery to print client 112. If print client 112 is connected to internet and internet print service 110, then document distributor 216 can provide the intermediate document to print client 112. Document distributor 216 can send a notification to print client 112 that a document is available, and when print client 112 receives the notification can request the document from document distributor 216.

If document distributor 216 can not immediately provide the document to print client 112 then the document may be stored in delivery storage 218. Document distributor 216 can periodically retry sending the document to print client 112. As alternative to document distributor retrying, internet print service 110 can provide a notification to print client 112 that a document is available from document distributor 216 when print client 112 connects to internet print service 110.

Internet print service 110 could also store an indication that print jobs are pending that print client 112 can check periodically or upon connecting to internet print service 110. If a certain time period expires or delivery storage 218 requires additional storage for other documents to be delivered to other print clients, the document may be removed from delivery storage 218. For example, delivery storage 218 can store a document for 24 hours after which the document will be removed and the print attempt failed.

Figure 3:
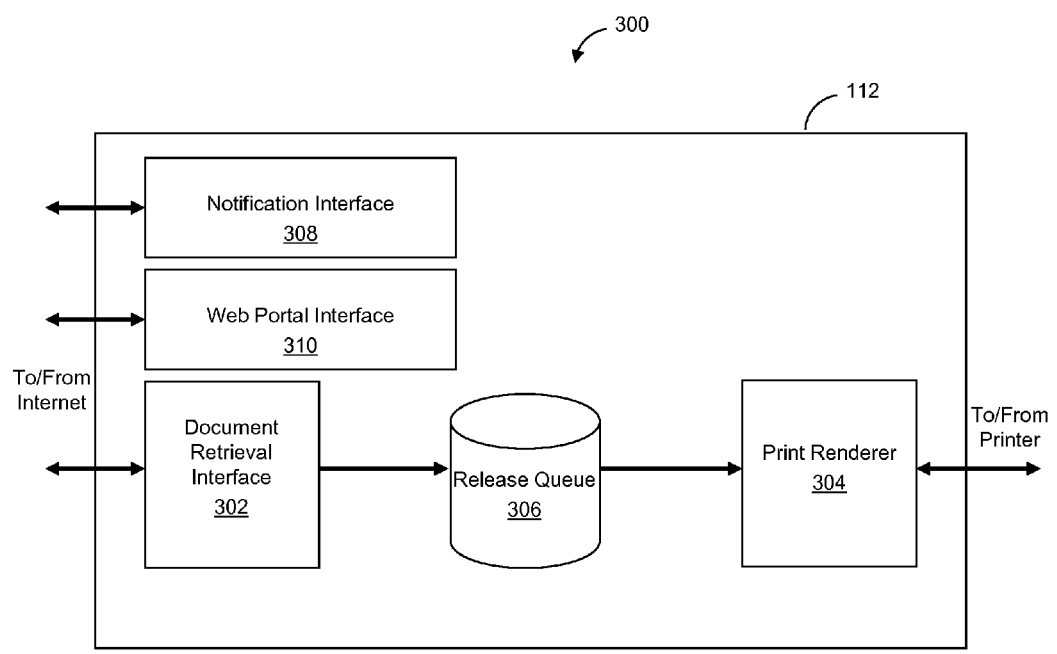
FIG. 3 is a block diagram illustrating the components of print client shown in FIG. 1.

Referring now to FIG. 3, shown is a block diagram 300 illustrating the components of print client 112 shown in FIG. 1. The elements shown in diagram 300 can include software and hardware elements. Some elements may be provided by a print client software program and other aspects may be provided, at least in part, by operating system software and system hardware.

Print client 112 includes a document retrieval interface 302 for receiving and/or retrieving documents from document distributor 216 of internet print service 110. Document retrieval interface 302 can poll internet print service 110 to determine if any documents are available for print client 112 for printing. Alternatively, notification that a document is available can be provided to print client 112 by notification interface 308 that indicates that document retrieval interface 302 should download the document.

After a document is received, typically in an intermediate document format, the document is then rendered by print renderer 304 for printer 114. In some embodiments, printer 114 can be capable of printing the intermediate document format natively where the received electronic document can be sent to the printer without rendering the document by print renderer 304. Print renderer 304 can be a print driver that converts the intermediate document into the format expected by printer 114. Print renderer 304 can be provided as part an operating system service, such as the Common Unix Printing System. The rendered format can include printer command language for communicating with printer 114.

Prior to the document being rendered by print renderer 304 it can be stored in release queue 306 that awaits the occurrence of a release condition before providing the document to print renderer 304. In the case of automatic print job release, release queue 306 may simply act as a buffer for print renderer 304. If release of print jobs is handled under the direction of internet print service 110, a notification to release the print job may be received from internet print service 110 over notification interface 308 that then releases the print job from release queue 306. A manual release method may also be used where user interface (not shown) provided by print client 112 allows a user to select a specific print job in release queue 306 for printing. Release queue 306 and print renderer 304 can also be re-ordered from that shown in FIG. 3 so that release queue 306 stores the rendered document produced by print renderer 304.

Notification interface 308 can include messaging with internet print service 110 to communicate status information between internet print service 110 and print client 112. Notification interface 308 can provide notifications via e-mail, web messaging, SMS or other message protocols to update a user (or internet print service 110) on the status of print client 112. For example, a message can be sent to a user for the following events: an electronic document is received by the print client 112; a print job is released from release queue 306; status change of printer 116; and error messages generated by printer 114 or print client 112.

Web portal interface 310 provides an interface to web portal 202 of internet print service 110 to allow print client 112 to communicate with internet print service 110 to create or manage an account. Web portal interface 210 can also interrogate printer 114 to determine the capabilities and options supported and then provide this information to internet print service 110 for storage in registry database 204.

Figure 4:
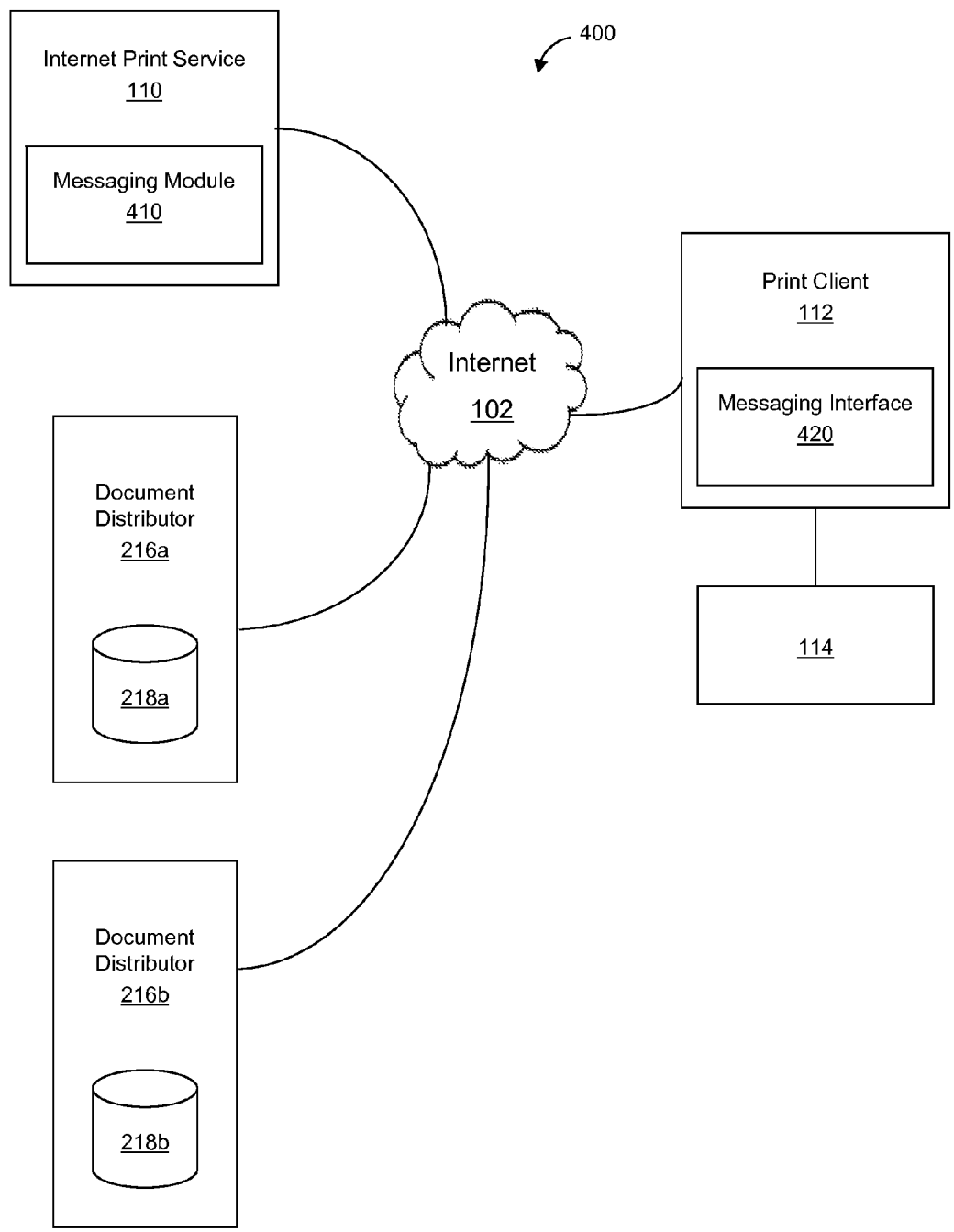
FIG. 4 is a block diagram illustrating a distributed delivery system for an internet print service.

Referring now to FIG. 4, is a block diagram 400 illustrating a distributed delivery system for internet print service 110 using a messaging protocol. The messaging protocol provides notifications between internet print service 110 and print clients 112 connected to printer 114. The messaging protocol can be used to provide an efficient method of load distribution between a number of document distributors, illustrated as document distributors 216a and 216b in FIG. 4, that are used by internet print service 110. Two document distributors are provided for example purposes but other embodiments can include any number of document distributors. Document distributors 216a-b can also each include an electronic document renderer (not shown) to distribute the processing load of renderining the electronic document in a format that is supported by print client 112 and printer 114.

The messaging protocol can also provide additional print options associated with a print job. The messaging protocol can also communicate presence information from print clients 112, such as, for example, a status indicator that conveys the ability of print client 112 to accept documents/print jobs for printing.

Any number of document distributors can be used in the system, and document distributors can be added over time to allow the system to scale to support a higher volume of documents. Multiple document distributors can also be used to provide a more efficient geographical distribution of print jobs. For example, a document distributor could be used to serve documents to the eastern half of the country and a separate document distributor could be used to serve documents to the western half of the country. Internet print service 110 can use geographic information associated with the destination print client 112 to determine which document distributor 216a-b should receive the document. The geographic information can be obtained through the registration process or from network data, such as but not limited to an IP address or DNS geo-location. Internet print service 110 can include a messaging module 410 to support the messaging protocol. Messaging module 410 can be implemented as a specifically tasked messaging server or cluster of servers, or a software module executing on a server (or multiple servers) to perform the messaging protocol. Messaging module 410 can be collocated with other elements of internet print service 110, such as those shown in FIG. 2, or can be implemented as a separately located server.

Print client 112 also has a messaging interface 420 for communicating using the messaging protocol with the messaging module 410 of internet print service 110. Messaging interface 420 can be provided as part of a print client software program. In other embodiments, messaging interface 420 can also be provided in part by the operating system of print client 112 that interfaces with a print client software program.

When internet print service 110 has a document for delivery to a print client 112, internet print service 110 decides which document distributor should receive the document for eventual delivery to print client 112. Internet print service 110 can make this decision based on a number of factors. For example, internet print service 110 may determine based on load feedback or storage space data provided by document distributors 216a-b that document distributor 216b should receive the document for delivery to print client 112. In some embodiments this additional data may be communicated between the document distributors 216*a-b* and internet print service 110 using the messaging protocol. Alternatively, internet print service 110 may determine based on geographic information related to print client 112 that document distributor 216*a* should receive the document for delivery to print client 112 since document distributor 216*a* is nearest geographically. In yet another alternative, internet print service 110 could distribute documents between the document distributors 216*a-b* in a round-robin manner; distributing documents either over all document distributors or within a group of document distributors that service a similar geographic region. Other variations could utilize network information about internet 102 to select from document distributor 216*a-b* based on print client 112, such as, but not limited to, the number of network hops, the network link speed and congestion information. Time of day could be another factor used to select from document distributors 216*a-b* since document distributors located in different time-zones may have a different load based on the business day in that time-zone.

Another factor used to select from document distributors 216*a-b* can include whether the document distributor can process the specified type or format of the electronic document for rendering for print client 112. For example, document distributor 216*a* may support a particular format of word processing document that is not supported by document distributor 216*b* such that document distributor 216*a* should be selected. This may be done to lower licensing costs by only having a limited number of document distributors with the capability to render a certain type or format of an electronic document.

Messaging module 410 sends a message to a destination print client 112 to indicate that internet print service 110 has stored the print job at one of document distributors 216*a-b* for delivery to print client 112. When print client 112 receives the message, print client 112 can then request the print job from the document distributor indicated in the message. The message from internet print service 110 can indicate the document using a unique identifier and network address, such as but not limited to an IP address or domain name of the document distributor. The message can also include print options associated with the print job, such as, for example, the number of copies, paper format, print quality and other options supported by printer 114. Messaging module 410 can identify users associated with print client 112 and can maintain a database that associates user accounts with the appropriate print client 112.

If print client 112 is not currently connected with the messaging module 410 of internet print service 110, then the message will be retained by messaging module 410 until print client 112 is available. Internet print service 110 may determine whether print client 112 is connected by receiving presence information through the messaging protocol from print client 112 that notifies internet print service 110 that it can accept print jobs. When a presence information message is received from print client 112, internet print service 110 can then send any pending messages stored by messaging module 410. An advantage of using a messaging protocol to send print job information is that if there are a large number of print clients 112, internet print service 110 will not be inundated with polling requests from print clients 112 to determine if print jobs are available. Another advantage is that internet print service 110 does not require a persistent TCP network connection between every print client 112 which is very resource intensive.

Another advantage of using a messaging protocol between messaging module 410 of internet print service 110 and messaging interface 420 of print client 112 is that the messaging protocol can be used when the client software is behind a firewall. An example messaging protocol can include XMPP which supports HTTP bindings to web servers, such as Apache, for example. This can be used by internet print server 110 to push notifications to print client 112 through messaging interface 420 making an HTTP connection to messaging module 410 to receive messages as soon as they are sent. Using HTTP allows messaging interface 420 to fetch and post messages using commonly open ports without interruption from firewalls. For example, messaging interface 420 can connect to an Apache web server of internet printer server 110 using port 80 (or 443 for secure socket layer connections).

If print client 112 uses a message protocol over HTTP, most firewalls will allow print client 112 to fetch and post HTTP messages without any hindrances. Thus, in scenarios where the TCP port used by an XMPP implementation by print client 112 is blocked, internet printer server 1120 can also listen on the normal HTTP/HTTPS ports and the traffic will not be intercepted by a firewall operating on the network of print client 112.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

We claim:

1. A print service for coordinating printing of electronic print documents over the internet, the print service in communication with a print client device over the Internet and the print client device coordinating availability to a printer for transmitting and printing of the electronic print documents, the print service comprising:
 a processor and memory, the processor configured to execute the steps of:
  receiving a first electronic print document over the internet from a computing device;
  rendering the first electronic print document into a second electronic print document of a format compatible with the print client device such that the second electronic print document is based on the first electronic print document;
  receiving presence information from the print client device to notify the print service that the print client device is available to receive the second electronic print document for subsequent sending to the printer to print;
  sending an availability message to the print client device to notify the print client device that the second electronic print document is available as a result of said print client device being available;
  receiving a request message from the print client device requesting the second electronic print document from the print service; and
  sending the second electronic print document to the print client device in response to the request message received from the print client device for having the second electronic print document forwarded to the printer to result in subsequent printing of the second electronic print document by the printer.

2. The print service of claim 1, the processor further configured to execute the step of: rendering the second electronic print document from the format into a print format supported by the printer before submission of the second electronic print document to the printer for printing by the printer.

3. The print service of claim 1, wherein the format is selected from any one of JPEG, TIFF, and PDF.

4. The print service of claim 3, wherein the printer is capable of printing the format natively.

5. The print service of claim 1, the processor further configured to execute the step of: receiving the first electronic print document by any one of an e-mail and a web interface.

6. The print service of claim 5 further comprising a registry database that associates the printer with an identifier that is received with the first electronic print document.

7. The print service of claim 6, wherein the identifier is an e-mail address at the domain of the print service.

8. The print service of claim 6, the processor further configured to execute the step of: converting the first electronic print document into the second electronic print document using printing options.

9. The print service of claim 8, wherein the printing options are provided with the first electronic print document or provided by the registry database.

10. The print service of claim 6, wherein the registry database stores authorization information associated with the printer used to authorize the first electronic print document for printing by the printer.

11. The print service of claim 10, wherein the authorization information includes an access control list containing whitelisted e-mail addresses.

12. The print service of claim 6 further comprising a web portal that provides an interface for account creation and management that stores account information in the registry database.

13. The print service of claim 1 further comprising:
a plurality of document distributors having storage for a plurality of second electronic print documents, the plurality of document distributors to provide load distribution between the plurality of document distributors to efficiently deliver the plurality of second electronic print documents to the print client device,
wherein the print service distributes the plurality of second electronic documents between the plurality of document distributors.

14. The print service of claim 13, the processor further configured to execute the steps of: distributing the second electronic print document to a selected one of the plurality of document distributors, and sending a message to the print client device indicating that the second electronic print document is available at the selected document distributor.

15. The print service of claim 14, the processor further configured to execute the step of: distributing the second electronic print document to a selected one of the plurality of document distributors based on any one of geographical proximity; document distributor load feedback; document distributor available storage space; time of day; and network information.

16. The print service of claim 15, the processor further configured to execute the step of: determining whether the print client device is available based on presence information, and if the print client device is available, sending the message, and if the print client device is not available, storing the message for sending when the print client device is available based on presence information received from the print client device.

17. A method for coordinating printing of electronic print documents over the Internet by a print service, the print service in communication with a print client device over the internet and the print client device coordinating availability to a printer for transmitting and printing of the electronic print documents, the method executable as a set of instructions executed on a computer processor, the method comprising:
receiving a first electronic print document over the Internet from a computing device;
rendering the first electronic print document into a second electronic print document of a format compatible with the print client device such that the second electronic print document is based on the first electronic print document;
receiving presence information from the print client device to notify the print service that the print client device is available to receive the second electronic print document for subsequent sending to the printer to print;
sending an availability message to the print client device to notify the print client device that the second electronic print document is available as a result of said print client device being available;
receiving a request message from the print client device in response to the request message received from the print client device requesting the second electronic print document from the print service; and
sending the second electronic print document to the print client device for having the second electronic print document forwarded to the printer to result in subsequent printing of the second electronic print document by the printer.

18. The method of claim 17 further comprising the step of rendering the second electronic print document from the format into a print format supported by the printer before submission of the second electronic print document to the printer for printing by the printer.

19. The method of claim 17 further comprising the step of distributing a plurality of second electronic print documents between a plurality of document distributors, the plurality of document distributors having storage for the plurality of second electronic print documents, the plurality of document distributors to provide load distribution between the plurality of document distributors to efficiently deliver the plurality of second electronic print documents to the print client device.

20. The print service of claim 1, wherein subsequent to when the print client device is not connected to the print service, the print client device sends said presence information after the print client device connects to the print service.

21. The method of claim 17, wherein subsequent to when the print client device is not connected to the print service, the print client device sends said presence information after the print client device connects to the print service.

* * * * *